US005532292A

United States Patent [19]

Wainwright et al.

[11] Patent Number: 5,532,292

[45] Date of Patent: Jul. 2, 1996

[54] INTUMESCENT COMPOSITIONS

[75] Inventors: Robin Wainwright, Berkshire; Kenneth A. Evans, Buckinghamshire, both of Great Britain

[73] Assignee: Alcan International Limited, Montreal, Canada

[21] Appl. No.: 373,313

[22] PCT Filed: Jul. 16, 1993

[86] PCT No.: PCT/GB93/01511

§ 371 Date: Mar. 10, 1995

§ 102(e) Date: Mar. 10, 1995

[87] PCT Pub. No.: WO94/02545

PCT Pub. Date: Feb. 3, 1994

[30] Foreign Application Priority Data

Jul. 17, 1992 [GB] United Kingdom .................. 9215184

[51] Int. Cl.$^{6}$ .......................... C09K 21/14; C09K 21/00; C08K 3/18; C08K 3/22

[52] U.S. Cl. .......................... 523/179; 524/430; 524/432; 524/492; 252/606

[58] Field of Search ............................ 523/179; 524/379, 524/430, 432, 495, 425, 416, 492; 252/606

[56] References Cited

U.S. PATENT DOCUMENTS

| | | | |
|---|---|---|---|
| 3,284,216 | 11/1966 | Kaplan | 106/16 |
| 3,668,121 | 6/1972 | Masciantonio et al. | 252/8.1 |
| 3,726,829 | 4/1973 | Sayles | 260/41.5 R |
| 3,733,289 | 5/1973 | Burns et al. | 260/28.5 R |
| 3,969,291 | 7/1976 | Fukuba | 260/17.3 |
| 4,526,605 | 7/1985 | Frank | 65/273 |
| 4,645,782 | 2/1987 | Redfarn | 523/179 |
| 4,695,619 | 9/1987 | Hamermesh | 528/73 |
| 4,879,320 | 11/1989 | Hastings | 523/179 |
| 5,356,568 | 10/1994 | Levine | 252/606 |

FOREIGN PATENT DOCUMENTS

| | | |
|---|---|---|
| 0319299 | 12/1988 | European Pat. Off. . |
| 490117533 | 7/1992 | Japan . |
| 1095857 | 12/1967 | United Kingdom . |
| 1604908 | 8/1974 | United Kingdom . |
| 1497855 | 5/1976 | United Kingdom . |
| 2044127 | 3/1979 | United Kingdom . |

*Primary Examiner*—Paul R. Michl
*Assistant Examiner*—LaVonda R. DeWitt
*Attorney, Agent, or Firm*—Watts Hoffmann Fisher & Heinke

[57] ABSTRACT

An intumescent composition comprises saline soluble inorganic silicate fibrous material containing CaO, MgO and no more than 4% by weight of $Al_2O_3$, such as calcium magnesium silicate. The fibres may be vitreous, with an average length of 10 to 500 microns, and may form 5 to 30 weight percent of the composition. The composition may be incorporated in a coating composition, e.g. for wet coating (paint) or powder coating, or a mastic or putty, or a composition containing a polymer. Enhanced fire protection can be provided, and the coating compositions may be applied as a single thick coating rather than by building up thin layers.

15 Claims, 1 Drawing Sheet

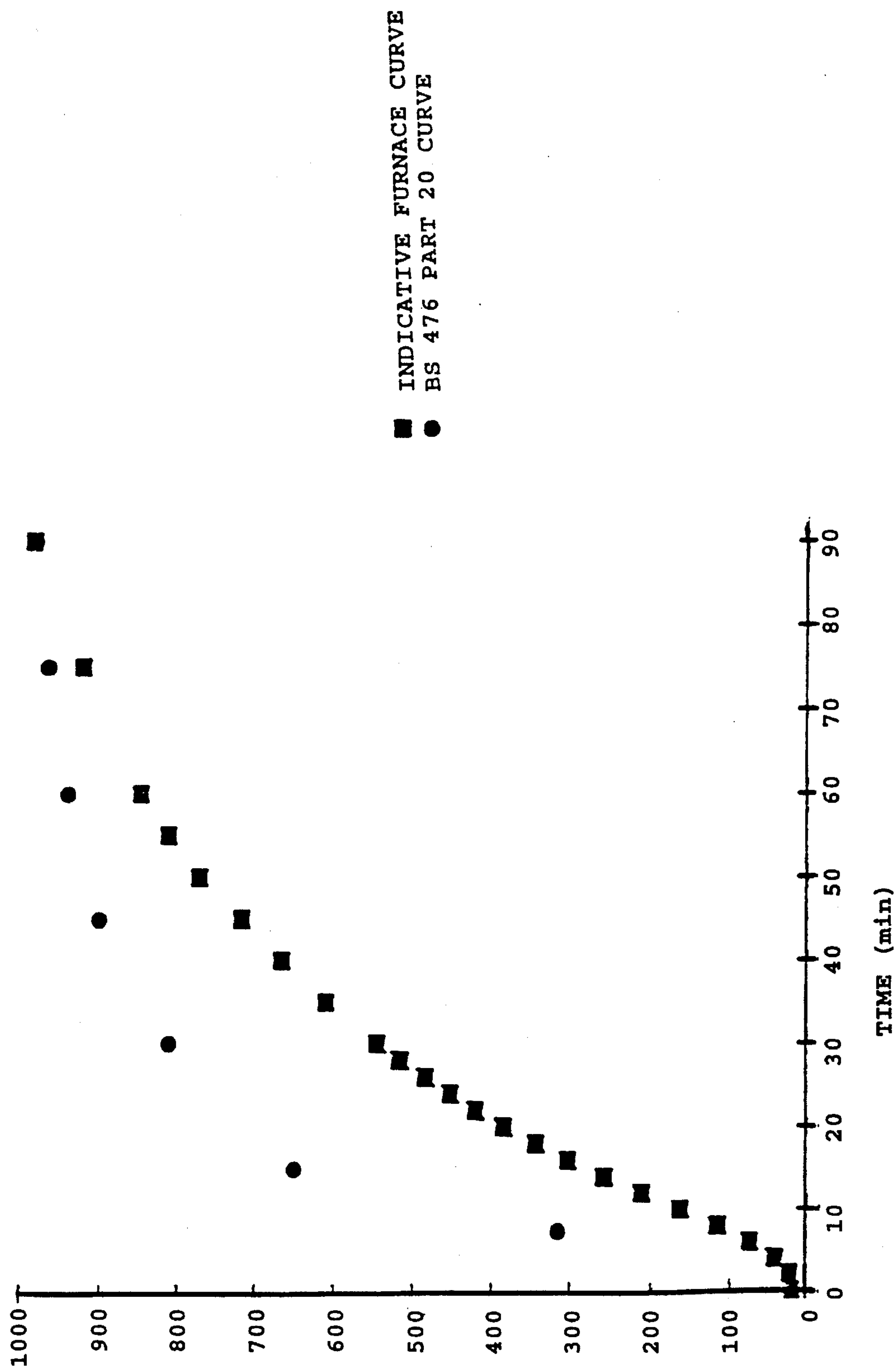
APPENDIX 1
TIME/TEMPERATURE CURVES FOR INDICATIVE
BS476 PART 20 FURNACE TESTS
INDICATIVE FURNACE CURVE
BS 476 PART 20 CURVE
TIME (min)
0
10
20
30
40
50
60
70
80
90
0
100
200
300
400
500
600
700
800
900
1000

INTUMESCENT COMPOSITIONS

This invention relates to intumescent compositions, and to coating compositions which incorporate such intumescent compositions and which can be applied to various substrates so as to form thereon an intumescent coating. It relates in particular to such intumescent and coating compositions which include inorganic fibres.

Intumescent coatings for providing thermal protection, flame retardation and/or smoke suppression are well known in the art. A typical coating composition for providing such a coating will include an intumescent composition and a film forming resin system.

Although the different components of the compositions will be referred to by function as though they were different materials, it should be understood that a single material may in some cases have more than one of the specified functions, either to a minor degree, so that it supplements the action of a component already provided, or to a major degree, so that it can replace or partially replace a component which would otherwise be required. Thus for example a film forming component of the resin system may itself contribute significantly to the formation of char. Furthermore the components may have other desirable properties, such as flame retardation, in addition to those primary functions specified.

Typically, the intumescent composition will comprise a catalyst (foaming agent), a carbonific or char forming agent, and a blowing agent. These are not necessarily different materials, as indicated above. Both the nature and the relative amounts (ranges) of these components are well known in the art.

The resin system will typically comprise a film forming binder. It may include a solvent, which may be either an organic solvent or water, but solvent free systems, e.g. for powder coating, are also possible.

The intumescent composition may optionally include other components such as pigments. In an intumescent coating composition, pigments may be considered to be part of the intumescent composition, or as components additional thereto.

Typical catalysts and/or foaming agents are monoammonium phosphate, diammonium phosphate, ammonium polyphosphate, potassium tripolyphosphate, or combinations thereof. Typical charring agents are pentaerythritol, dipentaerythritol, polyols, chlorinated paraffins, and combinations thereof. Typical blowing agents include melamine resins, urea, dicyandiamide and combinations thereof. An intumescent composition will typically comprise 10 to 55 parts by weight of catalyst, 4 to 35 parts by weight of char forming agent, and 5 to 40 parts by weight of blowing agent.

A typical intumescent coating composition will comprise the intumescent composition, 1 to 50 weight percent of film forming binder, 10 to 60 weight percent of solvent, and up to 40 weight percent of pigment. The film forming binder could be, for example polyvinyl acetate, acrylic resin, silicone resin, an epoxy, polyurethane, or a combination thereof. Typical organic solvents therefor are alcohols, naphthas, aromatic hydrocarbons and combinations thereof, and typical pigments include titanium oxide, zinc oxide, silicates, carbon black, lamp black, phthalocyanine blue or green, fillers such as calcium carbonate or barytes, or combinations thereof.

Elevated temperatures cause the intumescent coating both to decompose to form bubbles of gas, or vapour (for example steam), which cause the coating to swell, and to char. The resulting expanded char provides good thermal insulation and protection for the underlying substrate, but for efficient protection it is vital to have an expanded char which maintains its integrity and has a degree of mechanical strength, e.g. as measured by resistance to crushing. To this end the intumescent composition may comprise improving agents which increase the efficiency with which the composition provides protection. Typical improving agents include materials such as zinc borate; alumina trihydrate (ATH); magnesium hydroxide (synthetic or natural brucite), or any other thermally decomposable magnesium containing mineral (for example huntite or hydromagnesite); (all of the foregoing improving agents can also function as blowing agents and/or as flame retardants); and glass frits such as Ceepree (registered trade mark). One way in which certain of these materials are believed to act is by fusing to give the char good cohesion.

A further class of improving agent in which interest has been shown is that of inorganic fibrous materials. These are believed not only to strengthen the char and increase its integrity, but also to act to limit the size of bubble formation. If large bubbles were to form and erupt at the surface of the coating, the protective efficiency of the coating would be impaired.

The published literature will provide further details as to the state of the art concerning intumescent compositions and coating compositions; see for example U.S. Pat. No. 4,879,320 to Hastings (coating material including a particular type of alumino-silicate fibre material); U.S. Pat. No. 4,104,073 (intumescent paint); U.S. Pat. No. 3,284,216 (intumescent putty); and "Intumescent Reaction Mechanisms" By C E Anderson et al, in J Fire Sciences, Vol 3 (May/June 1985), commencing at page 161.

From a first aspect, the present invention provides an intumescent composition including fibrous material formed from a saline soluble inorganic silicate containing CaO, MgO and no more than 4% by weight of $Al_2O_3$.

The fibrous material may be a calcium magnesium silicate, and is preferably vitreous. Typically the material may contain 59 to 67 parts by weight of silicon oxide, $SiO_2$; 0 to 3.5 parts by weight of aluminium oxide, $Al_2O_3$; 19 to 35 parts by weight of calcium oxide, CaO; and 4 to 17 parts by weight of magnesium oxide, MgO.

The fibres of the fibrous material may be coated, for example by a metal, such as nickel, or treated chemically, for example by a silane. The fibres could even be coated by other components of the intumescent composition. Such treatments may well alter the saline solubility of the fibre as an entity, and it is to be understood that the term "saline soluble" is intended to apply to the silicate itself.

The fibres of the fibrous material typically form between 5 and 30 weight percent of the intumescent composition of the invention, preferably between 8 to 18 weight percent and more preferably 8 to 12 percent. The average fibre length of the fibres of the fibrous material is typically between 10 and 500 microns, and preferably 10 to 300 microns. The fibre diameter is typically 1 to 10 microns.

Saline solubility is traditionally measured in synthetic body fluids, by comparison with chrysotile asbestos; the latter is itself fairly soluble relative to other types of asbestos, and has therefore been adopted as a standard material in experiments on the solubility of mineral fibres. By "saline soluble" is meant more soluble than chrysotile asbestos. Preferably the solubility is more than 1000 times more soluble, and, even more preferably, more than 10,000 times as soluble.

It has been found that the solubility of a particular calcium magnesium silicate vitreous fibrous material, produced under the name of Superwool Grade X-607, which is used in preferred embodiments of the invention to be described hereafter, is over 100,000 times more soluble than chrysotile asbestos, so that any such material which does reach the lungs will not survive for any significant time and will thus have little chance of causing any damage.

Superwool Grade X-607 is produced by Thermal Ceramics Limited and Superwool is a registered trademark. As supplied, Superwool comprises approximately equal weights of fibre and shot (non-fibrous) material. If such a material is used in the present invention, as in Examples 1 and 2 below, the latter component would be expected to have no beneficial effect other than acting as an inert filler. It is equally possible to use material which has been de-shot (substantially all fibrous material), as in Examples A to H in the particular description which follows, and this may be beneficial in terms of surface finish and, possibly, mechanical properties.

Typically, saline solubility is measured by chopping the fibres in distilled water for 20 seconds, as much liquid as possible is then removed, and the fibres are dried at 110° C. The dried chopped fibres are weighed and placed in a centrifuge tube with the saline solution. The tube is placed in a shaking incubator water bath at body temperature, with a shaker speed of 20 cycles/minute. After a desired period, normally 5 hours or 24 hours, the tube is removed and centrifuged for 5 minutes. The supernatant liquid is drawn off and analyzed by atomic absorption to determine the increase of the elements comprising the fibres, for comparison with a chrysotile standard.

From a second aspect, the invention provides a coating composition for providing an intumescent coating comprising an intumescent composition according to the first aspect of the invention and a film forming resin system.

The resin system in such a coating composition may be dry, e.g. a powder for spray coating, or be solvent based; the solvent may be aqueous, or organic. The resin of the resin system may be, or include, an acrylic polymer or copolymer, a vinylidene chloride copolymer, a PVA copolymer, an alkyd resin, an epoxy resin, or a polyester resin, for example.

Typically, the fibres of the fibrous material of the coating composition form 2 to 20 weight percent of the composition, preferably 3 to 12 weight percent, and more preferably 4 to 10 percent. In Examples 1 and 2 described below they constitute 5 weight percent of the coating composition. The fibres of the fibrous material may be coated by the resin system and/or components of the intumescent composition.

The invention also provides a method of coating a substrate using such a composition, and a substrate so coated.

We have found that compositions for providing an intumescent coating according to the invention provide enhanced protective efficiency compared with other intumescent compositions, including those containing other types of fibrous material. They have an additional advantage that a single thick coating can be formed, in contrast with other compositions which may require several (e.g. ten) thin coatings in order to build up a sufficient thickness to give the required degree of protection.

A consideration which is important in assessing the performance of an intumescent coating is the degree to which smoke and carbon monoxide formation is suppressed. A further consideration of increasing significance in these times is the extent to which the release of organic solvents to the atmosphere can be avoided, thereby reducing atmospheric pollution and avoiding detrimental effects on the person applying the coating.

We are aware of only a very small number of commercially produced intumescent coating formulations which do not use organic solvent based resin systems. When known fibre containing intumescent compositions are used, it is difficult to combine them with a water based resin system so as to obtain a product with sufficiently high fibre content for good performance.

In contrast, with this invention we have identified fibrous materials which are readily compatible with water based resins as well as organic solvent based resins. Coatings from such water based formulations have been observed to give reduced smoke and carbon monoxide emission compared with those from known solvent based formulations, so that both this problem and that of emitting organic solvent vapours during application are addressed by the use of this particular type of fibrous material.

The invention will be further described by reference to the following Examples 1 and 2 and the compositions A to H designated (K), and the accompanying Figure, together with comparative Examples and compositions which do not fall within the scope of the invention. The sole accompanying Figure illustrates the time-temperature curve followed in reduced scale (indicative) BS476 Parts 20 and 21 Furnace tests.

A typical intumescent powder blend composition according to the invention, which can be incorporated into a film forming resin system to provide a composition according to the invention, consists of the following components:

| COMPONENT | RANGE (parts by weight) |
|---|---|
| Foaming agent, such as mono-ammonium phosphate, diammonium phosphate, ammonium polyphosphate, potassium tripolyphosphate. | 10–55 |
| Carbonic or charring agent, such as pentaerythritol, dipentaerythritol, polyol. | 4–35 |
| Blowing agent, such as melamine, urea, dicyandiamide chlorinated paraffin. | 5–40 |
| Fire retardant additive, such as aluminium trihydroxide, magnesium hydroxide (synthetic or natural brucite) or any other thermally decomposable magnesium containing mineral such as huntite or hydromagnesite, zinc borate, antimony trioxide, tin oxide. | 0–30 |
| Smoke suppressant additive, such as molybdenum trioxide, ammonium octamolybdate, iron oxide, ferrocene. | 0–10 |
| Fire barrier additive, such as Ceepree, sodium silicate, inorganic glasses. | 0–30 |
| Pigment, such as titania, zinc oxide, carbon black, phthalocyanine blue. | 0–40 |
| Superwool Grade X-607 fibres with average lengths ranging from 100 μm to 5000 μm depending on the application | 5–30 |

Combinations of components having the same function can be used, or single components.

A preferred blend is composed as follows (parts by weight):

| COMPONENT | |
|---|---|
| Ammonium polyphosphate | 42 |
| Melamine | 18 |
| Pentaerythritol | 15 |
| Dicyandiamide | 10 |
| Superwool Grade X-607 | 8 |
| Ceepree | 5 |
| Zinc Borate | 2 |

This formulation is referred to as Blend K, and is well suited for incorporation into water borne resins, but should also function well in thermosetting, thermoplastic and oil-based resin systems. Similar blends, not forming part of the invention, where the Superwool component is replaced by alumina/silica fibres (of the type disclosed in U.S. Pat. No. 4,879,320—Hastings) or by zinc borate, will hereafter be referred to as Blend A/S and Blend Z respectively.

In the blend K the Superwool is de-shot material, i.e. substantially all fibre, and the composition was found to be 60 to 67 parts by weight of silicon oxide, SiO2; 0 to 3.5 parts by weight of aluminium oxide, $Al_2O_3$; 26 to 35 parts by weight of calcium oxide, CaO; and 4 to 6 parts by weight of magnesium oxide, MgO.

Typical compositions for water borne or oil based intumescent coating compositions are as follows:

| COMPONENT | RANGE (and preferred composition) WET | DRY |
|---|---|---|
| Blend K or Z or A/S | 35–75 (55) | 50–88 (75) |
| Non-active solids (binder) | 10–35 (18) | 12–50 (25) |
| Volatile solvent (water, styrene,xylene, acetone, etc.) | 15–40 (27) | 0–5* (0) |

*Small amounts of solvent may be present if not properly dried.

The water borne binder could be:

- a vinyl acrylic copolymer, such as that supplied under the tradename Haloflex 202 from ICI plc.
- a polyacrylic resin, such as Maincote HG-54 from Rohm and Haas Company;
- a PVA copolymer;
- a styrene acrylic copolymer; or
- a vinylidene chloride copolymer, such as Polidene 33-075 from Scott-Bader Company Ltd.

Maincote and Polidene are registered trade marks.

A binder suitable for use with an xylene solvent is that supplied under the tradename Vilkyd 122×50 (alkyd), from Varnish Industries Ltd.

Typical compositions for intumescent coating compositions based on thermosetting binders are as follows:

| COMPONENT | RANGE (and preferred composition) WET | DRY |
|---|---|---|
| Blend K or Z or A/S | 35–75 (45) | 35–75 (45) |
| Non-active solids (binder) | 10–65 (55) | 25–65 (55) |
| Volatile solvent (styrene, xylene, acetone etc.) | 0–30 (0) | 0–5* (0) |

*Small amounts of solvent may be present if not properly dried.

The binder could be:

- CY1301/HY1300, a bisphenol A type epoxy/amine system, from Ciba Geigy; or
- P2400 Uralac polyester/PT810 TGIC, from DSM and Ciba Geigy respectively.

INITIAL PERFORMANCE TESTS

In Example 1 and comparative Example 1A, the resin system was water based, and comprised 40 parts of water and 120 parts of Scott-Bader Polidene resin (an acrylic resin). The resin system of Example 2 and comparative Example 2A comprised 120 part of Ciba-Geigy CY1301/HY1300 epoxy with 40 parts of xylene as an organic solvent.

Formulations were made up as follows:

| Examples | Parts by weight ½ | 1A/1B |
|---|---|---|
| Superwool (fibrous material - see below) | 40 | |
| Alumina/silica (fibrous material) (Carborundum) | | 40 |
| Amgard MC (catalyst) | 96 | 108 |
| Melamine (char former) | 32 | 36 |
| Pentaerythritol (blowing agent) | 32 | 36 |
| ATH (BACO SF4E) (Alcan Chemicals Europe) | 8 | |
| Zinc borate | 8 | |
| Ceepree (Brunner Mond) | 8 | |
| Titania (pigment) | 16 | 20 |
| Resin System | 160 | 160 |
| Total parts | 400 | 400 |

Angard and Ceepree are registered trade marks.

For the purposes of this description, the intumescent composition comprises all the components of these formulations with the exception of the resin system and the optional exception of the titania (that is to say, the composition may or may not be considered to include the latter).

In Examples 1 and 2, the Superwool was not de-shot, and the weight given above includes the shot component, i.e. the amount of Superwool fibres is about 20 parts by weight (5 weight percent). The composition of the Superwool fibres used here was found to be 59 to 64 parts by weight of silicon oxide, $SiO_2$: 0 to 3.5 parts by weight of aluminium oxide, $Al_2O_3$; 19 to 23 parts by weight of calcium oxide, CaO; and 14 to 17 parts by weight of magnesium oxide, MgO.

Each formulation was coated on one side of a small aluminium plate to a thickness of 500±50 μm. A butane blowlamp flame was then applied to the coating and the temperature on the reverse side of the plate was measured using a thermocouple.

Furthermore each formulation was coated to a thickness of 500±50 μm on one side of a small steel plate which was then placed in a kiln at 700° C. for 3 hours. A butane blowlamp flame was then applied to the coating and the temperature on the reverse side of the plate was measured using a thermocouple.

The temperatures measured in both types of test, in degrees Celsius, are set out in the following table

| Example | Aluminium plate | Steel plate |
|---|---|---|
| 1 | 220 | 245 |
| 2 | 170 | 213 |
| 1A | 251 | 297 |
| 2A | 297 | 230 |

Thus it can be seen that Examples 1 and 2 are more effective than the comparative Examples in preventing heat transfer. In addition the chars from the kiln appeared to be stronger mechanically for Examples 1 and 2 relative to the comparative Examples.

FURTHER PERFORMANCE TESTS.

Water borne, oil based and thermosetting preferred compositions were prepared by stirring the Blend K, Z or A/S described above into each water borne, oil based or thermosetting resin system as set out below (all in parts by weight), for comparison with two commercial intumescent paints, viz:

Nullifire S602 (unknown resin type in xylene); and No-Fire C (water borne acrylic system).

| Composition A | |
|---|---|
| Intumescent Powder Blend K, A/S or Z | 55 |
| Haloflex 202 | 30 |
| Water | 15 |
| **Composition B** | |
| Intumescent Powder Blend K, A/S or Z | 55 |
| Polidene 33-075 | 33 |
| Water | 12 |
| **Composition C** | |
| Intumescent Powder Blend K | 55 |
| PVA Copolymer (from Kemira Coatings) | 30 |
| Water | 15 |
| **Composition D** | |
| Intumescent Powder Blend K | 55 |
| Styrene-acrylic coplymer (from Kemira Coatings) | 36 |
| Water | 9 |
| **Composition E** | |
| Intumescent Powder Blend K | 55 |
| Maincote HG-54 | 43 |
| water | 2 |
| **Composition F** | |
| Intumescent Powder Blend K | 45 |
| CY1301 epoxy resin | 41.3 |
| HY1300 amine hardener | 13.7 |
| **Composition G** | |
| Intumescent Powder Blend K | 45 |
| P2400 polyester resin | 50 |
| PT810 hardener | 5 |
| **Composition H** | |
| Intumescent Powder Blend K | 55 |
| Vilkyd 122 × 50 resin | 36 |
| Acetone | 9 |

In these compositions the amount of solvent added has been adjusted to take account of the solvent content of the resin component; the amount of fibres in the coating composition is 4.4 weight percent, and in the dried composition is 6 weight percent, for each of compositions A to E and H. In compositions F and G, where no solvent is involved, the coating and dried compositions both contain 3.6 weight percent of fibres.

Water borne, epoxy and oil based coatings were applied either by brushing or pouring onto steel substrates. The intumescent polyester composition was prepared by extrusion of a molten polyester/Blend K, Z, or A/S mixture, and the solid extrudate was crushed, sieved and used to coat a steel substrate by powder coating with an electrostatic spray gun. Each coating was examined, both wet and dry, to ascertain the fluid consistency and quality of the surface finish.

Appearance (wet)

Intumescent powder blends were dispersed into most resin systems to give a smooth consistency. However, blends containing alumina/silica fibres were not compatible with most of the water borne resins. Only Haloflex 202 and Polidene 33-075 resin systems gave usable coatings in this case.

Flexibility tests

The flexibility of each coating was examined by the Erichson Indentation method, in which a ball bearing is caused slowly to indent the underside of a coated steel panel, the extent of indentation necessary to produce cracking was measured and recorded on a scale of 0 to 15 mm. The coating thickness for each formulation was approximately 500 μm.

| COMPOSITION | DRY COATING THICKNESS (mm) | INDENTATION TO FAILURE (mm) |
|---|---|---|
| A (K) | 0.54 | 1.5 |
| A (A/S) | 0.57 | 1.6 |
| A (Z) | 0.51 | 1.6 |
| B (K) | 0.55 | 1.6 |
| B (A/S) | 0.57 | 1.4 |
| B (Z) | 0.54 | 1.7 |
| C (K) | 0.51 | 9.0 |
| D (K) | 0.57 | 1.8 |
| E (K) | 0.50 | 1.6 |
| F (K) | 0.60 | 0.9 |
| G (K) | 0.61 | 2.0 |
| H (K) | 0.59 | 2.1 |
| Nullifire S602 | 0.60 | 4.8 |
| No-Fire C | 0.55 | 5.4 |

Small Indicative BS 476 Parts 20 and 21 Tests

BS 476 Part 20 specifies a temperature requirement and apparatus for achieving this, and the circles in the Figure show the temperature regime for a metal plate inserted into the test apparatus. The apparatus actually used to test each formulation was smaller than the official version, resulting in an alteration of the temperature regime to that indicated by the squares, with a slower initial temperature rise. The results from this apparatus are expected to be "indicative" of the results from the large scale test. In this apparatus the time taken for an uncoated metal plate to reach 550° C. was 30 minutes, compared with 11 minutes in the official version. BS 476 Part 21 sets out a procedure designed to test structural members.

A sufficient mass of each formulation was applied to a steel plate, size 6 cm by 10 cm, to provide a dry film thickness of 1 mm. A hole was drilled into the underside of the plate for insertion of a thermocouple. The plate was covered with ceramic wool, leaving only the coated surface exposed, and the arrangement was placed in an electric furnace capable of an average temperature increase of 15 degrees C./minute up to a maximum of 1000° C. The time taken for the plate to reach a temperature of 550° C. was recorded for each coating formulation, and the height of the char was measured at the end of each test.

In this test a difference of one minute is considered significant.

| COMPOSITION | DRY COATING THICKNESS (mm) | TIME (min) | CHAR HT (mm) |
|---|---|---|---|
| A (K) | 1.10 | 49 | 40 |
| A (A/S) | 1.12 | 46 | 30 |
| A (Z) | 1.07 | 47 | 30 |
| B (K) | 1.10 | 48 | 25 |
| B (A/S) | 1.11 | 46 | 25 |
| B (Z) | 1.05 | 45 | 25 |
| C (K) | 1.06 | 48 | 45 |
| D (K) | 1.18 | 45 | 10 |
| E (K) | 1.05 | 45 | 30 |
| F (K) | 1.00 | 45 | 30 |
| G (K) | 1.00 | 45 | 30 |
| H (K) | 1.00 | 47 | 20 |

-continued

| COMPOSITION | DRY COATING THICKNESS (mm) | TIME (min) | CHAR HT (mm) |
|---|---|---|---|
| Nullifire S602 | 1.10 | 48 | 45 |
| No-Fire C | 1.12 | 43 | 30 |

Smoke Tests

A sufficient mass of each formulation was applied to a steel plate, size 7.5 cm by 7.5 cm, to provide a dry film 1 mm thick. NBS smoke tests were then carried out to BS 6401 1983 (non-flaming mode) and the specific optical density Ds recorded for each formulation as an average of three measurements.

| COMPOSITION | DRY COATING THICKNESS (mm) | Ds |
|---|---|---|
| A (K) | 1.03 | 43 |
| B (K) | 1.11 | 67 |
| C (K) | 1.05 | 51 |
| D (K) | 1.15 | 169 |
| E (K) | 1.10 | 119 |
| F (K) | 1.02 | 117 |
| G (K) | 1.02 | 181 |
| H (K) | 1.01 | 175 |
| Nullifire S602 | 1.12 | 68 |
| No-Fire C | 1.13 | 58 |

Thus far, much of the disclosure has concentrated on the use of intumescent compositions according to the invention in the formation of coating compositions, and the application of the coating compositions to continuous substrates, such as of steel. However, intumescent compositions according to the invention may have alternative uses; for example, they can serve as an active filler for any polymer material, and, indeed, the solvent free coating composition of Example G can be considered to be a filled polymer,, since the polymer is a bulk solid plastics material before being ground to powder. Intumescent mastic and putty compositions are also well known in the art, and an intumescent composition according to the invention could also serve as an active filler material for use therein.

Moreover, coating compositions according to the invention are usefully applicable to other forms of substrate, for example fibre mats of the type which could be used in furniture (particularly aircraft seats) as an interliner between a foam cushion and a fabric cover to protect the foam from an external fire source.

Glass or mineral fibre mats or fibre papers are usually held together with a binder, and once heat is applied the binder decomposes leaving the mat weak and brittle. To test the effectiveness of a coating composition according to the invention at thermally insulating the binder in the presence of fire, a test loosely based on FAR (Fireproof and Fire Resistance Tests) Part 23 was devised.

Vetrotex continuous filament glass fibre mat, with and without a coating according to the composition of Example A (K), and Superwool X607 paper, with and without a coating according to the composition of Example A (Z), were placed in a furnace at 1000° C. for 5 minutes. If, after cooling, the mat could support a weight of 50 gm, in the form of a long glass rod, it passed the test, but if the fibres fractured, the mat failed (FAR Part 23 states that the tested component must be in a working condition for a pass to be awarded).

Both the uncoated mats failed, and both the coated mats passed the test. Thus the use of a coating composition according to the invention can delay the decomposition of fibre mat binders significantly.

I claim:

1. An intumescent composition including saline soluble inorganic silicate fibrous material containing CaO, MgO and no more than 4% by weight of $Al_2O_3$.

2. An intumescent composition as claimed in claim 1 wherein the fibres of the fibrous material are formed of a calcium magnesium silicate.

3. An intumescent composition as claimed in claim 1 wherein the fibrous material is vitreous.

4. An intumescent composition as claimed in claim 1 wherein the fibres of the fibrous material have an average fibre length of between 10 and 500 microns.

5. An intumescent composition as claimed in claim 1 wherein the fibres of the fibrous material are coated, or treated chemically.

6. An intumescent composition as claimed in claim 5 wherein the fibres have a metallic coating.

7. An intumescent composition as claimed in claim 5 wherein the fibres are treated with silane.

8. An intumescent composition as claimed in claim 1 wherein the fibres of the fibrous material form 5 to 30 weight percent of the composition.

9. A coating composition for providing an intumescent coating comprising an intumescent composition as claimed in claim 1 and a film forming resin system.

10. A coating composition according to claim 9 wherein the resin system is water based.

11. A coating composition according to claim 9 wherein the resin system includes an acrylic resin.

12. A coating composition according to claim 10 wherein the resin system includes a PVA copolymer.

13. A coating composition suitable for providing an intumescent coating by powder coating comprising an intumescent composition as claimed in claim 1 and a thermosetting resin powder.

14. A coating composition according to claim 9 wherein the fibres of the fibrous material form 2 to 20 weight percent of the coating composition.

15. A composition which comprises a polymer, or which is in the form of a mastic or putty, and which also comprises an intumescent composition according to claim 1.

* * * * *